United States Patent
Li

(10) Patent No.: US 8,218,598 B1
(45) Date of Patent: Jul. 10, 2012

(54) METHOD TO PROGRAM THE STARTING PHASE OF THE SPREAD SPECTRUM

(75) Inventor: Gabriel Li, San Francisco, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 774 days.

(21) Appl. No.: 12/054,328

(22) Filed: Mar. 24, 2008

Related U.S. Application Data

(60) Provisional application No. 60/896,766, filed on Mar. 23, 2007.

(51) Int. Cl.
*H04B 1/00* (2006.01)
(52) U.S. Cl. ........ 375/130; 375/215; 375/294; 375/135; 375/376
(58) Field of Classification Search .......... 375/130, 375/215, 294, 135, 136, 376
See application file for complete search history.

(56) References Cited

U.S. PATENT DOCUMENTS

| | | | | |
|---|---|---|---|---|
| 6,650,193 | B2 * | 11/2003 | Endo et al. | 331/78 |
| 2003/0081653 | A1 * | 5/2003 | Hardin et al. | 375/130 |
| 2005/0242851 | A1 * | 11/2005 | Booth et al. | 327/156 |

* cited by examiner

*Primary Examiner* — Kabir A Timory

(57) ABSTRACT

Disclosed is a circuit and method to program the starting phase of the spread spectrum of a clock output. The circuit includes a plurality of phase locked loop (PLL) circuits for generating a plurality of spread spectrum waveforms. The circuit also includes a spread control circuit for controlling each of the plurality of PLL circuits in accordance with a plurality of respective spread profiles. The spread profiles are configured to vary a starting phase of each spread spectrum waveform such that a total energy of each spread spectrum waveform is out of phase with other spread spectrum waveforms.

12 Claims, 7 Drawing Sheets

200

METHOD TO PROGRAM THE STARTING PHASE OF THE SPREAD SPECTRUM

This application claims priority under 35 U.S.C. §119(e) to U.S. Provisional Application No. 60/896,766, filed on Mar. 23, 2007, the entire contents of which are hereby incorporated by reference herein.

BACKGROUND

1. Field of the Invention

The present invention relates generally to timing circuits used in computer systems, and, more particularly, to a circuit and method to program the starting phase of the spread spectrum of a clock output.

2. Background Information

Semiconductor devices have increased in speed and degree of integration, leading to problems related to EMI (electromagnetic interference) due to electromagnetic wave radiation from associated devices. As the operation frequency has increased, the wavelengths have become shorter and the wiring length of a connecting circuit has become almost as short as the wavelength of a high frequency signal. Therefore, the connecting sections of wires may serve as antennas and electromagnetic wave radiation is increased. The electromagnetic wave radiation of electronic devices using semiconductor devices which operate at a high clock frequency causes adverse effects, such as malfunctions due to mutual interference between electronic device and interference with communication devices. In digital systems, clocks can be the noisiest sources of EMI radiation. They are generally the highest frequency sources in the system and drive the heavy capacitive load with fast edge rates. The problems related to EMI are reduced by improving the arrangement of circuits, providing adequate shielding, and on the like. However, portable equipment is required to be more compact and lighter every year, and shielding mechanisms have often proved difficult to implement. In conventional methods, the operating clock frequency of a semiconductor device is changed slightly and/or the peak of noise is scattered by the addition of a jitter to a clock signal. In one example of a conventional method, spread spectrum clock generation (SSCG) is utilized. Spread spectrum circuits operate by 'spreading' the frequency of a clock signal over a narrow band of frequencies to reduce the peak EMI energy. In a conventional spread spectrum solution, when a counter value changes, overshoots occurs at the beginning of the first pulse of the resulting waveform and undershoots occur at the bottom of the first pulse. The overshoot and undershoot typically start oscillating outside the desired spread range of the system.

FIG. 1 illustrates a block diagram of a conventional SSCG circuit designated by a general reference character 100. The SSCG circuit 100 generates a clock output CK (102) from a reference clock signal CLK (101). The frequency of the clock CK 102 output is M/N times that of the reference clock signal CLK (101), by utilizing a PLL (Phase Locked Loop) circuit as a divider. The SSCG circuit comprises a 1/N divider 111, a frequency phase comparator 112, a charge pump (CP) 113, a loop filter 114, a voltage control oscillator (VCO) 117, a 1/M divider 118, a modulator 115, and a voltage addition circuit 116.

Referring to FIG. 1, the frequency phase comparator 112 detects a phase difference between the CLK 101 divided by a factor of N and the CK 102 divided by a factor of M, and outputs a signal to control the CP 113 in accordance with the phase difference. The CP 113 outputs a signal to charge and discharge the loop filter 114 in accordance with the phase difference, and a differential voltage in accordance with the phase difference is generated at one end of the loop filter 114. In a conventional clock generation circuit, which does not carry out the spread spectrum modulation, a differential voltage is applied to the VCO 117 and a clock with a constant period is generated accordingly. In the SSCG circuit 100, however, the modulator 115 outputs a spectrum modulation signal, which has a small amplitude and changes in a predetermined spread spectrum modulation period.

FIG. 2 shows the spectrum modulation signal characterized by the general designation 200. Referring again to FIG. 1, the spectrum modulation signal, such as that illustrated in FIG. 1, can be added to the differential voltage in the voltage addition circuit 116 and applied to the VCO 117. The amplitude of the spectrum modulation signal is sufficiently smaller than that of the differential signal, and the spread spectrum modulation period is sufficiently longer than a period of the generated clock CK 102. As a result, the period of the generated clock CK 102 changes in a predetermined cycle, with the period M/N times the period of the reference clock signal CLK 101 being the center. The change of period and the cycle are determined by the spectrum modulation signal generated by the modulator. The response time of the PLL circuit is set to a time sufficiently shorter than the period of the spectrum modulation signal. The PLL will track the spectrum modulation signal.

Conventional SSSG methods have the disadvantage of a fixed starting phase of the spread profile with a resulting increase in emission energy (EMI) of the spread profile when a plurality of clocks start at the same phase of the profile. It would therefore be desirable to have an improved spread spectrum of a clock output that has a lower EMI of the spread energy with a plurality of clocks that start their spread in a predetermined delta phase to each other.

SUMMARY OF THE INVENTION

A circuit and method are disclosed for programming the starting phase of the spread spectrum of a clock output. In accordance with exemplary embodiments of the present invention, according to a first aspect of the present invention, a system includes a plurality of phase locked loop (PLL) circuits for generating a plurality of spread spectrum waveforms. The system includes a spread control circuit for controlling each of the plurality of PLL circuits in accordance with a plurality of respective spread profiles. The spread profiles are configured to vary a starting phase of each spread spectrum waveform such that a total energy of each spread spectrum waveform is out of phase with other spread spectrum waveforms.

According to the first aspect, the spread control circuit can include a spread spectrum profile Read Only Memory (ROM) coupled to the spread control circuit. The spread control circuit can be enabled by an input reference signal, a spread spectrum enable signal and an initial state signal. The spread spectrum profile ROM can be coupled to a plurality of readers. The plurality of readers can be configurable in increments of base values. Output of the plurality of readers can be added to one of an M divider or an N divider depending on a feed forward spread operation or a feedback spread operation.

According to a second aspect of the present invention, a method includes the steps of: applying a spread spectrum to an input reference signal; loading a plurality of spread address counters with a spread profile; and enabling a plurality of clocks that start their spreads in phase to each other, thereby providing the spread spectrum with a programmable starting phase.

According to the second aspect, the method can include the steps of: detecting an initial state of a first spread address counter; and loading the first counter with a spread profile, the spread profile to cause an initial negative frequency slope in the output reference signal. The step of loading the first counter with the spread profile can include the steps of: loading a base value into the first counter; adding a first offset value of a plurality of offset values to the base value, the first offset value to decrease a frequency of the output reference signal; loading the first added value into the first counter; adding a second offset value of the plurality of offset values to the base value, the second offset value to decrease the frequency of the output reference signal; and loading the second added value into the first counter after incrementing spread address counter. The plurality of offset values can substantially form an inverted Lexmark spread pattern or the like in the output reference signal. The first offset value can be added to the first counter in accordance with a feed forward spread operation. The second offset value can be added to the second counter in accordance with a feedback spread operation.

According to a third aspect of the present invention, a method includes the steps of: applying a spread spectrum profile to an input reference signal; modulating the input reference signal within a narrow frequency band; reducing a peak Electromagnetic Interference (EMI) in the input reference signal; and multiplying and dividing the input reference signal to generate a variable output reference signal.

According to the third aspect, the output reference signal can comprise a substantially inverted triangular clock signal or the like. The step of reducing the peak EMI can include the steps of: loading a plurality of offset values to a spread profile; and varying a plurality of counters to determine the status of an input reference signal to generate a clock signal, thereby modulating the clock signal with a slower frequency. The spread spectrum profile can be configured in a feedback spread operation and a feed forward spread operation. The feedback spread operation can include the steps of: loading a counter with a corresponding offset value; and reloading the counter with a new value as the counter approaches a minimum value. The feed forward spread operation can include the steps of: loading a counter with a corresponding offset value; and reloading the counter with a new value as the counter approaches a minimum value. The feedback spread operation and feed forward spread operation can be repeated in individual cycles to turn off a spread enable signal. The spread spectrum profile can be applied to an input reference signal, thereby spreading out the input reference signal. The input reference signal can be modulated with a slow frequency band for providing a spreaded signal.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a circuit and method to program the starting phase of the spread spectrum of a clock output. According to exemplary embodiments, the present circuit and method can lower the peak of the Electromagnetic Interference (EMI) of the spread energy for an electronic system having a number of clocks that start their spread in phase to each other. Reference signals, such as clock signals or the like, can generate radiation spikes in the fundamental frequency as well as the harmonic frequencies. By applying a spread spectrum to the signal, energies of the input reference signal can be spread out by modulating the input reference signal with a slower frequency, thereby spreading the input reference signal over a narrow band of frequency. The present method further reduces the peak EMI. For example, a spread spectrum may be applied to a 200 MHz clock signal, resulting in the 200 MHz signal being modulated with a slower frequency, such as, for example, 33 kHz. In order to modulate the input reference signal by the slower frequency, a spread profile, which can be stored in the Read-Only Memory (ROM), contains offset values that change the value of the M/N divider. In one embodiment, the values contained in the M and N counters that determine how the input reference signal is multiplied and divided to generate the output reference signal may be changed by a user. The spread profile (e.g., frequency variation over time) can substantially form, for example, an inverted triangular pattern or the like in the output reference signal. Alternatively, the spread profile can substantially form, for example, an inverted Lexmark spread pattern or the like in the output reference signal.

Figure 1:
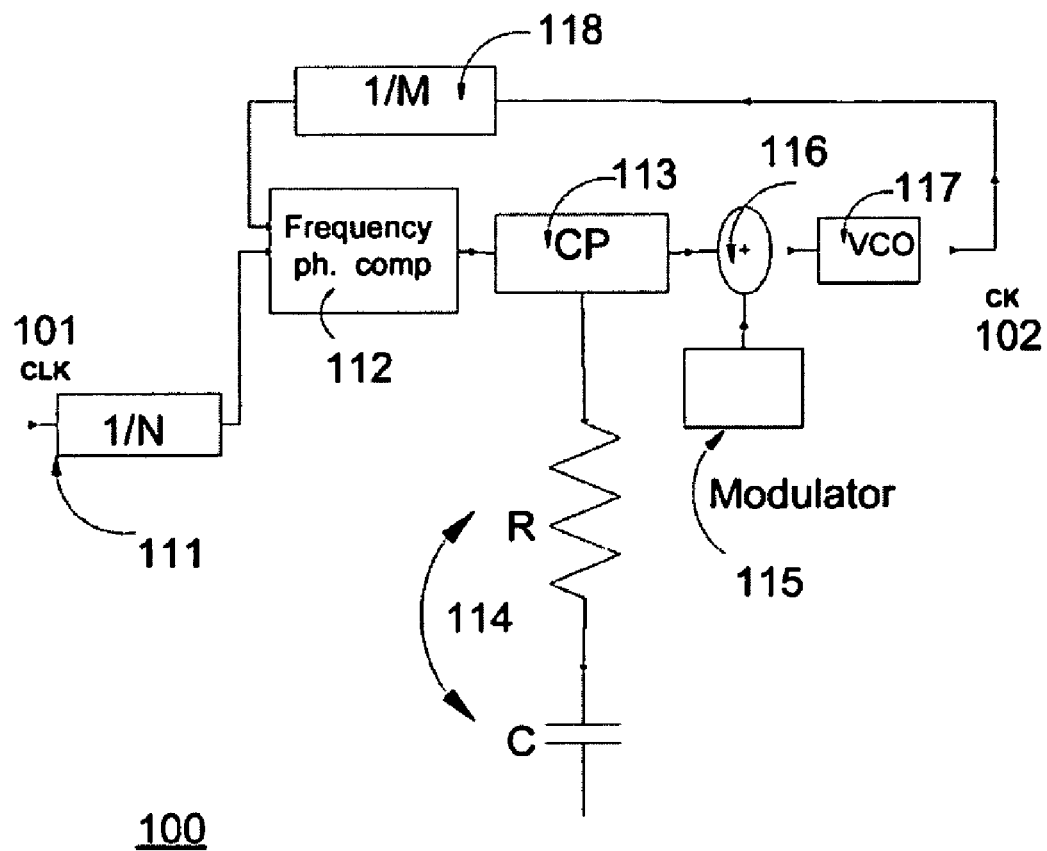
FIG. 1 illustrates a block diagram showing a configuration of a conventional spread spectrum clock generation (SSCG).
Figure 2:
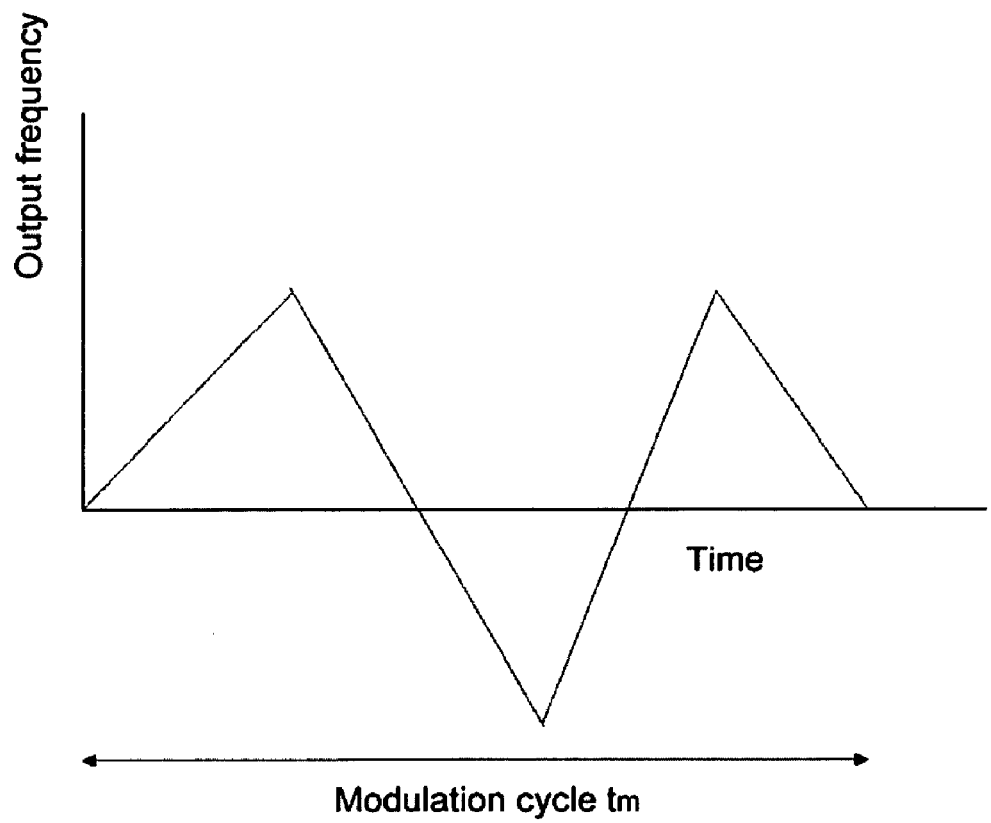
FIG. 2 illustrates a spectrum modulation signal of the conventional spread spectrum clock generation (SSCG) circuit.
Figure 3:
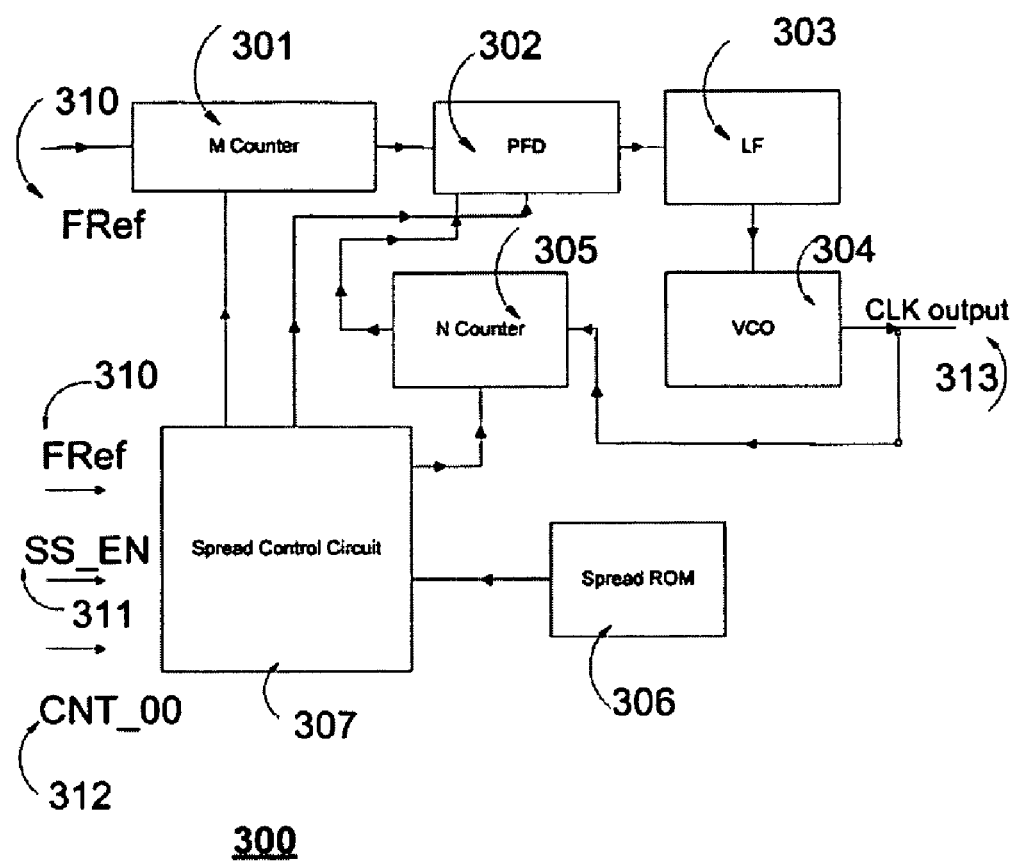
FIG. 3 illustrates a block diagram of a PLL synthesizer with a spread control circuit according to an exemplary embodiment of the present invention.

These and other aspects and embodiments of the present invention will now be described in greater detail. A Phase Locked Loop (PLL) synthesizer circuit with a spread control circuit according to an exemplary embodiment of the present invention is illustrated in FIG. 3 and designated by the general reference 300. The PLL synthesizer circuit 300 comprises an M-counter 301, Phase Frequency Detector (PFD) 302 coupled to an output of the M-counter 301, Loop Filter (LF) 303 coupled to an output of the PFD 302, Voltage Controlled Oscillator (VCO) 304 coupled to an output of the LF 303, N-counter 305 coupled to an output of the VCO 304 and an input of the PFD 302. PLL synthesizer 300 is coupled to a spread-control circuit 307. In one embodiment, the spread-control circuit 307 is coupled to an input of the M-counter 301, the PFD 302 and the N-counter 305. The PLL synthesizer circuit 300 further comprises a spread ROM 306 coupled to the spread-control circuit 307. The spread-control circuit 307 is configured to receive one or more of the following inputs: input reference signal $F_{REF}$ 310; spread spectrum enable signal SS_EN (311); and initial state signal CNT_00 (312). The input reference signal $F_{REF}$ 310 is also applied as an input to M-counter 301.

In one embodiment, the input reference signal $F_{REF}$ 310 can be an input reference signal received by a crystal oscillator or the like, and the output reference signal can be a clock output (CLK) 313. Spread-control circuit 307 is configured to output control signals to the M-counter 301, PFD 302 and the N-counter 305. The input reference signal $F_{REF}$ 310 is divided by the value of M-counter 301 (where M can be any suitable value) before feeding the frequency into PFD 302. The frequency of the input reference signal $F_{REF}$ 310 is further multiplied by the value of the N-counter 305 (where N can be any suitable value). The output reference signal (CLK) 313 is taken from the VCO 304.

Referring to FIG. 3, the spread-control circuit 307 can output one or more of the output control signals to perform various appropriate functions. For example, spread-control circuit 307 can receive a plurality of offset values (e.g., δM, δN) from the spread ROM 306. For the "feedback" spread operation (i.e., feedback through N-counter 305), the δN value is added to the N counter value by spread-control circuit 307, which is then loaded to the N-counter 305. The N-counter 305 will count down, and upon reaching zero it will reload the new value from the spread-control circuit 307. The process will repeat until the N-counter 305 causes the spread-enable signal SS_EN 311 to be turned off. For the "feedforward" spread operation (i.e., through the M-counter 301), the δM value is added to the M counter value by the spread-control circuit 307, which is then loaded to the M-counter 301. The M-counter 301 will count down, and upon reaching zero it will reload the new value from the spread-control circuit 307. The process will repeat until the M-counter 301 causes the spread-enable signal SS_EN 311 to be turned off.

Figure 4:
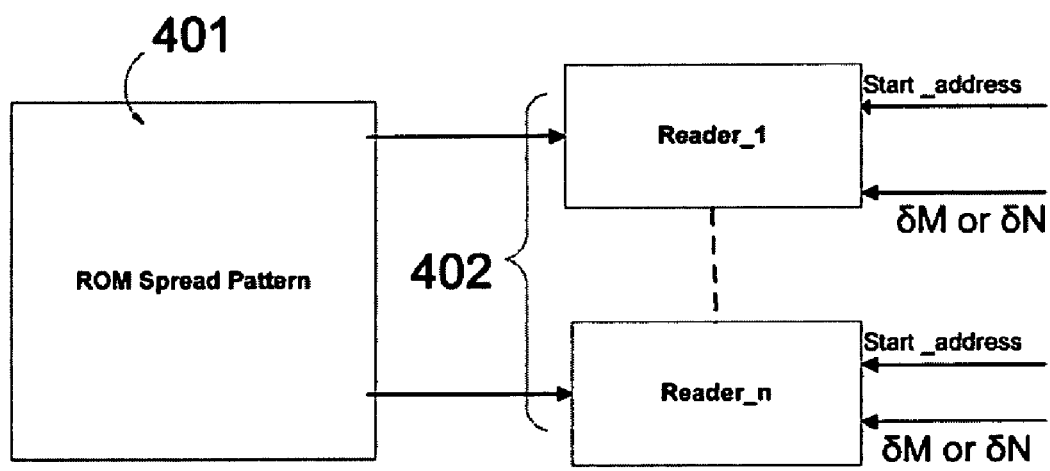
FIG. 4 illustrates a block diagram of a ROM spread pattern according to an exemplary embodiment of the present invention.

In accordance with the embodiment of the present invention, FIG. 4 illustrates a block diagram representation 400 of a full spread spectrum profile comprising a read only memory (ROM) spread pattern 401 generated from the spread ROM 306 (illustrated in FIG. 3). The full spread spectrum profile can comprise, for example, a Triangular or Lexmark profile or any other suitable spread spectrum profile, of 128 bytes deep or other suitable depth. The system 400 includes a plurality of readers 402 (for example, Reader_1 to Reader_n, where n can be any suitable number) that are configured in order of increments (for example, 0-127, or any other suitable increments). The starting location or address of the readers 402 can be loaded via an on-chip register (for example, I2C or other suitable means). The output from the readers 402 can be a multiple bit (for example, 4 bit or other suitable bit length) δM or δN word to be added to the M multiplier value or N divider value (for use in the M-counter 301 and N-counter 305, respectively) depending on the feed forward or feedback spread operation. The spread spectrum profile can substantially form, for example, an inverted triangular spread pattern or any other suitable type of spread pattern in the output reference signal.

Figure 5:
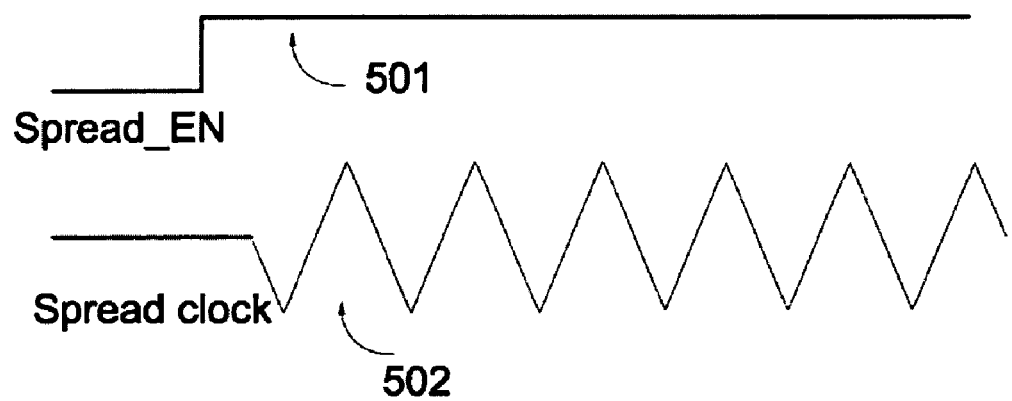
FIG. 5 illustrates a waveform showing the clock output of the fixed starting phase of a conventional spread spectrum profile from a ROM.
Figure 6:
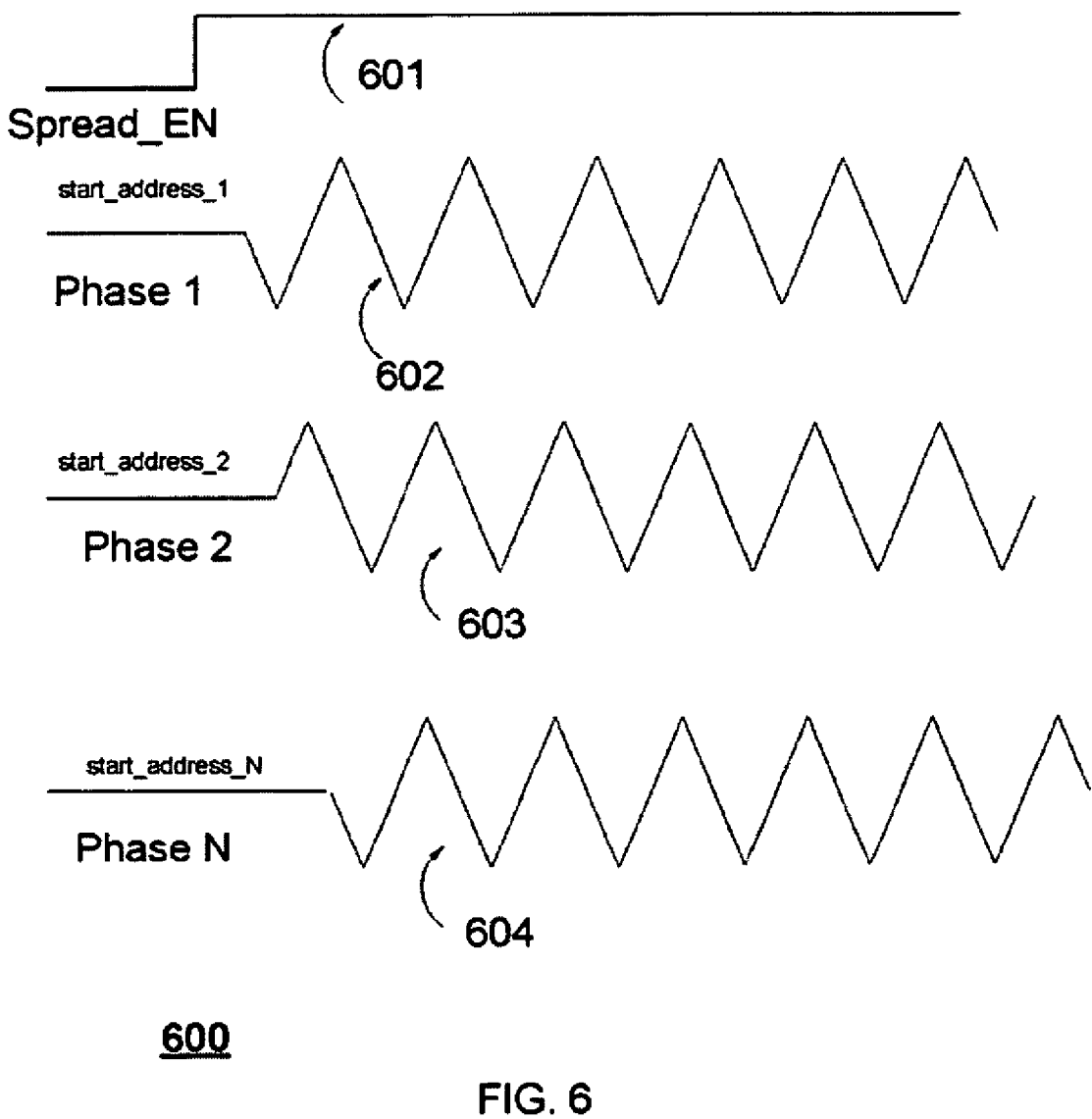
FIG. 6 illustrates waveforms showing the clock output with a programmable starting phase of a spread spectrum, in accordance with an exemplary embodiment of the present invention.

FIG. 6 illustrates a waveform representation 600 of a spread spectrum profile in accordance with an exemplary embodiment of the present invention in comparison to a conventional scheme 500 illustrated in FIG. 5. Referring to FIG. 5, the fixed starting phase of a spread spectrum waveform 502 with a single spread clock is shown by loading the M and N counters with a spread profile, Spread_EN (501). FIG. 6 illustrates spread spectrum waveforms (602, 603 and 604) generated from a plurality of clocks. The spread spectrum waveforms 602, 603, and 604 start their spreads in phase to each other by loading the M- and N-counters 301 and 305, respectively, with the spread profile Spread_EN (601). The start_address_n (e.g., 1 through N, where N can be any suitable value, and, for example, for a 8 bit wide bus or other appropriate width bus) is loaded via a plurality registers (for example, I2C registers or the like) when the signal CNT_00 is set. Referring to FIG. 3 in comparison to FIG. 6, all start addresses are loaded into the spread ROM 306 at the onset of Spread_EN 601. The spread profile (Spread_EN 601) with different start addresses is configured to skew the spread spectrum waveforms 602, 603, and 604 with respect to each other. Hence, the peaks of the spread spectrum waveforms (e.g., 602, 603 and 604) are not occurring at the same time. The peak emission energy of each waveform (e.g., 602, 603 and 604) is thereby "spread" across the full cycle.

Reference signals, such as clock signals or the like, can generate radiation spikes in the fundamental frequency, as well as the harmonic frequencies. By applying a spread spectrum to the plurality of signals, energies of the input reference signal can be spread out by modulating the input reference signal with a slower frequency. In other words, the spreading of the input reference signal over a narrow band of frequencies reduces the peak EMI. For purposes of illustration and not limitation, a spread spectrum may be applied to, for example, a 200 MHZ clock signal, resulting in the 200 MHZ signal being modulated with a slower frequency, for example 33 kHz or other suitable frequency. In order to modulate the input reference signal by a slower frequency, a spread spectrum profile, that can be stored in, for example, a spread ROM 306 or the like, contains offset values that change the value of the M/N divider.

Figure 7:
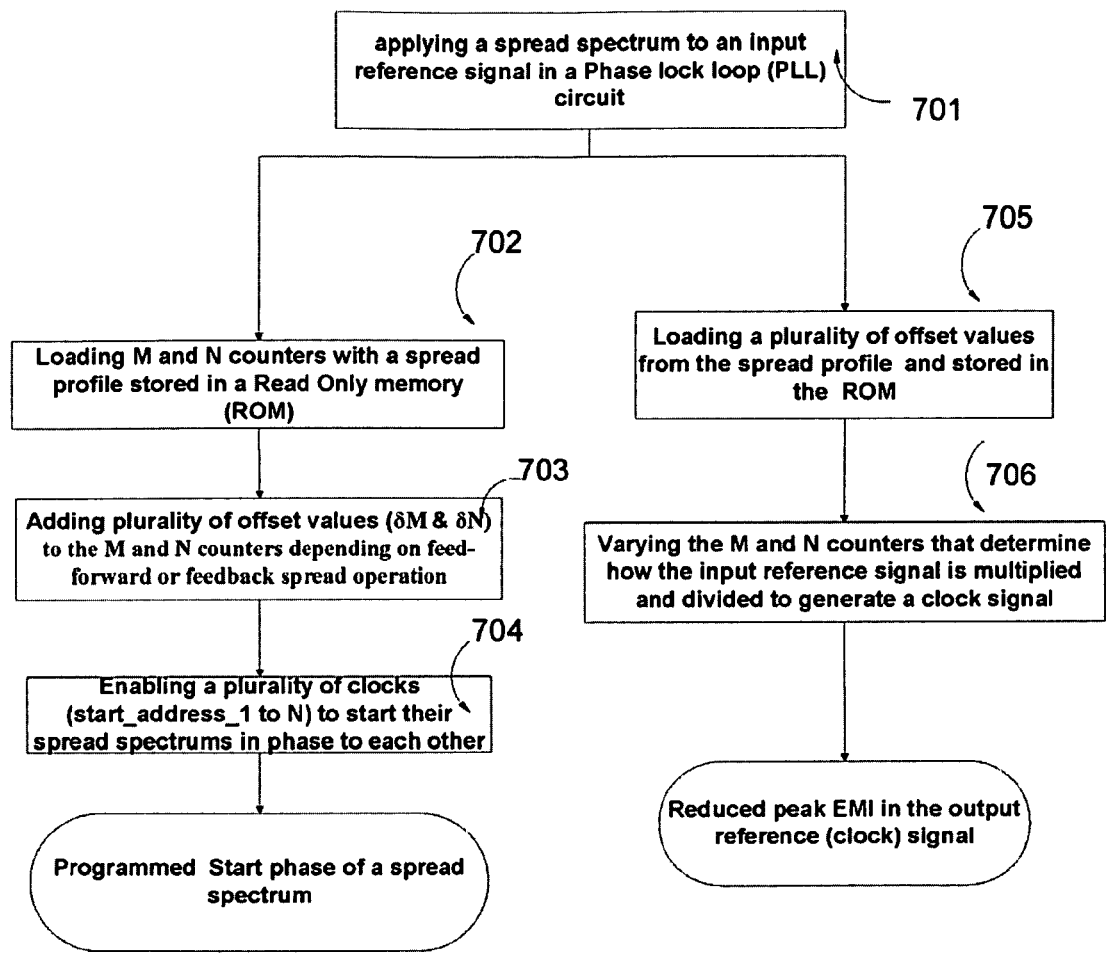
FIG. 7 illustrates a flow chart diagram of a method to program the starting phase of a spread spectrum, in accordance with an exemplary embodiment of the present invention.

FIG. 7 illustrates a flow chart diagram 700 of a method to program the starting phase of a spread spectrum, according to an embodiment of the present invention. Step 701 comprises applying a spread spectrum to an input reference signal in a phase lock loop circuit. Step 702 comprises loading the M and N counters with a spread profile stored in a Read Only Memory (ROM). Step 703 comprises adding a plurality of offset values (e.g., δM and δN) to the M and N counters depending on feed forward or feedback spread operation. Step 704 comprises enabling a plurality of clocks (e.g., start_address 1 to N, where N can be any suitable value) to start their spread spectrum waveforms in phase to each other, thereby providing a programmable starting phase of the spread spectrums. Further, in parallel, step 705 comprises loading a plurality of offset values from the spread profile and stored in the ROM. Step 706 comprises varying the M and N counters that determine how the input reference signal is multiplied and divided to generate a variable output reference clock signal. The peak EMI in the input reference signal is therefore reduced by modulating the input reference signal within a narrow frequency band.

Embodiments of the present invention are well suited to performing various other steps or variations of the steps recited herein, and in a sequence other than that depicted and/or described herein. In one embodiment, such a process can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Each of elements of the system 300 can be comprised of any suitable type of electrical or electronic circuit, component or device that is capable of performing the functions associated with the respective element. Any or all of the components of system 300 can be connected to one another using any type of electrical connection capable of communicating electrical information. Alternatively or additionally, any or all components of the system 300 can be formed on, for example, a monolithic substrate. Details of the programming of the starting phase of a spread spectrum and the methods of designing and manufacturing the same that are widely known and not relevant to the present discussion have been omitted from the present description for purposes of clarity and brevity.

It should be appreciated that reference throughout the present specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics can be combined as suitable in one or more exemplary embodiments of the present invention.

Similarly, it should be appreciated that in the foregoing discussion of exemplary embodiments of the invention, various features of the present invention are sometimes grouped together in a single embodiment, figure, or description thereof for the purpose of streamlining the disclosure to aid in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A system, comprising:
   a plurality of phase locked loop (PLL) circuits for generating a plurality of spread spectrum waveforms; and
   a spread control circuit for controlling each of the plurality of PLL circuits in accordance with a plurality of respective spread profiles;
   the spread control circuit adapted to spread a multiplier (N) of a reference clock (CLK) to each PLL circuit, and to spread a multiplier (M) of a generated clock (CK) of each PLL circuit;
   a spread spectrum profile memory coupled to the spread control circuit, wherein the spread control circuit is enabled by an input reference signal, a spread spectrum enable signal and an initial state signal;
   the spread spectrum profile memory coupled to a plurality of readers; and
   wherein an output of the plurality of readers is added to one of an M divider or an N divider depending on a feed forward spread operation or a feedback spread operation.

2. The apparatus of claim 1, wherein the plurality of readers are configurable in increments of base values.

3. The apparatus of claim 1, further comprising:
   spreading N by applying a set of offsets to N.

4. The apparatus of claim 1, further comprising:
   spreading M by applying a set of offsets to M.

5. The apparatus of claim 3, further comprising:
   the set of offsets to N associated in a memory with frequency spreading values for the generated clock signal CK.

6. The apparatus of claim 4, further comprising:
   the set of offsets to M associated in a memory with frequency spreading values for the generated clock signal CK.

7. A method comprising:
   operating a plurality of phase locked loop (PLL) circuits to generate a plurality of spread spectrum waveforms;
   controlling each of the plurality of PLL circuits in accordance with a plurality of respective spread profiles stored in a memory, the memory coupled to a plurality of readers;
   spreading a multiplier (N) of a reference clock (CLK) over the PLL circuits, and spreading a multiplier (M) of a generated clock (CK) over the PLL circuits;
   providing an input reference signal, a spread spectrum enable signal and an initial state signal;
   adding an output of the readers to one of an M divider or an N divider depending on a feed forward spread operation or a feedback spread operation.

8. The method of claim 7, wherein the plurality of readers are configurable in increments of base values.

9. The method of claim 7, further comprising:
   spreading N by applying a set of offsets to N.

10. The method of claim 7, further comprising:
    spreading M by applying a set of offsets to M.

11. The method of claim 9, further comprising:
    the set of offsets to N associated in a memory with frequency spreading values for the generated clock signal CK.

12. The method of claim 10, further comprising:
    the set of offsets to M associated in a memory with frequency spreading values for the generated clock signal CK.

* * * * *